United States Patent
Fruehwirth

Patent Number: 5,943,818
Date of Patent: Aug. 31, 1999

[54] SYSTEM FOR PROPAGATION OF PLANTS

[75] Inventor: Franz Fruehwirth, Encinitas, Calif.

[73] Assignee: Paul Ecke Ranch, Inc., Encinitas, Calif.

[21] Appl. No.: 08/876,556

[22] Filed: Jun. 16, 1997

[51] Int. Cl.[6] .............................. A01G 31/00; A01G 9/02
[52] U.S. Cl. .................................. 47/1.01; 47/17
[58] Field of Search ................... 47/1.01, 17, 39, 47/65, 901; 198/377.01, 406, 408, 702

[56] References Cited

U.S. PATENT DOCUMENTS

| | | | |
|---|---|---|---|
| 119,580 | 10/1871 | Daniels | 198/702 |
| 269,295 | 12/1882 | Kirby | 198/702 |
| 2,824,410 | 2/1958 | Daw | 47/1.01 R |
| 2,826,003 | 3/1958 | Oki et al. | 47/1.01 R |
| 3,529,379 | 9/1970 | Ware | 47/17 |
| 3,909,978 | 10/1975 | Fleming | 47/17 |
| 4,221,764 | 9/1980 | Saxon | 198/702 |
| 5,180,602 | 1/1993 | Bainbridge et al. | 198/377.01 |

Primary Examiner—Michael J. Carone
Assistant Examiner—Elizabeth Shaw
Attorney, Agent, or Firm—Arnold, White & Durkee

[57] ABSTRACT

A system for propagating plants in a greenhouse, wherein plant containers are circulated along a serpentine travel path which lies in a generally vertical plane. Plants in the containers are passively irrigated and fed. Sprays may be used to treat the plants for diseases, insects, etc.

8 Claims, 4 Drawing Sheets

SYSTEM FOR PROPAGATION OF PLANTS

BACKGROUND OF THE INVENTION

1. Field of the Invention

The present invention relates generally to a system for quantity production of plants. More particularly, it concerns a system for efficient propagation, growth and flowering of plants in a greenhouse environment.

2. Description of Related Art

Greenhouses or nurseries are widely used for the cultivation of plants, especially in northern areas. The plants in the form of roots, cuttings or the like are placed in containers with soil substrates, compost, nutrients, etc. The containers are typically arranged in horizontal arrays on the floor of a greenhouse or on tables within the greenhouse. The contents are then maintained under favorable growing conditions in the greenhouse until the desired growth has been obtained. Mists, sprayers and the like may be employed to water the plants; nutrients may be added in various ways; and the plants may be treated for the prevention of diseases. Natural light is obtained from the sun, but artificial light sources may also be used. In general, efforts are made to maintain the growing conditions as natural as practicable.

Typically, greenhouses are relatively low structures, in part because of the nature of these buildings and also because of environmental and weather considerations. In recent years it has been suggested that they be built as vertical towers. It has also been suggested that plants be moved vertically within these towers on endless belts under complex controlled conditions of artificial lighting, watering, feeding, etc. A general purpose of the vertical tower installations is to conserve space, and to stimulate growth. Greenhouse propagation of poinsettias is of particular interest in North America and Europe. In poinsettia propagation, vegetative cuttings (shoot tips) are removed from "mother plants" and placed in an environmentally controlled greenhouse until roots develop near the basal end of the cuttings. This is also known as asexual or clonal propagation. Cuttings are at risk and incapable of functioning as a complete plant until roots develop. Over the years, new technology has enhanced the successful "rooting" of cuttings. Intermittent mist systems increase humidity and prevent cutting desiccation until new roots form. Specially formulated rooting media provide a disease free environment surrounding the basal end of the cutting. These media also allow optimum levels of moisture and oxygen for root initiation and development.

SUMMARY OF THE INVENTION

The present invention in one broad aspect concerns a system for increasing the productivity of greenhouses, while maintaining the environmental conditions that prevail there. More particularly, the system exploits the overhead space in a greenhouse by growing plants or plant cuttings on at least four levels using a laterally disposed endless belt or other conveyor. The conveyor follows a serpentine path along generally lateral, vertically spaced and generally parallel travel legs from a lowermost leg to the uppermost leg and then return to the lowermost leg. The conveyor reverses direction when traveling between the end of each leg in the sequence and the start of the next leg in the sequence.

A plurality of plant containers are pendulously supported at intervals along the conveyor to remain upright throughout travel of the conveyor.

Preferably, the endless conveyor comprises a pair of belts, cables or the like, and the plant support members extend laterally between the belts or cables generally normal to their direction of travel. The plant containers are preferably wire mesh, perforated, or otherwise porous to enable water and nutrients to enter the containers.

The endless conveyor is supported via a framework from the base or floor of the greenhouse. Pulleys, sheaves or other rotatable members are rotatably mounted on the framework to support the conveyor.

In a preferred form, a suitable supply pan or other relatively shallow supply container is mounted proximate the bottom of the framework and below and extending along the porous plant support members to enable the plant containers to dip through and within the supply container so as to take up water, nutrients and the like into the plants. The supply container is preferably positioned near one end of the framework where the endless conveyor begins its travel along the lowermost travel leg.

The continuous motion of the conveyor repeatedly moves cuttings or other plants through four or more horizontal planes of greenhouse space during the production time period. By increasing production in the same greenhouse space with little or no increased input of raw materials, the system is environmentally friendly, space saving, labor saving, economically efficient and highly adaptable for the propagation, production and flowering of many plant species, including flowering and crop plants.

The system of the invention is environmentally friendly, because the same amounts of water, energy and chemicals are used to root increased numbers of cuttings or other plants as compared to typical propagation houses or greenhouses with one level of cuttings. The system is labor efficient because the system can be loaded and unloaded from a single work station as opposed to moving plants throughout a greenhouse and placing cuttings on a stationary bench. The system is space saving, requiring less space than conventional single level arrangements by employing 2,4,6,8, etc levels depending on particular commercial or space requirements. This system is efficient, because it requires less capital investment in greenhouses and less operating expense. For example, where four levels of plant carriers are utilized, operating expenses are contemplated to be lowered by up to 70%.

Other efficiencies include flexibility for rooting cuttings and growing and flowering plants of many species; a decrease of plant diseases through better air circulation around the cuttings and plants which creates an unfavorable environment for disease organisms; and a passive system for irrigation and fertilization of the plant substrate.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

Specific details of the invention and typical benefits derived therefrom are illustrated by the accompanying drawings, in which.

DESCRIPTION OF ILLUSTRATIVE EMBODIMENTS

The system of the invention is installed in typical greenhouses. Various apparatus and methods may be employed for watering, fertilizing, spraying, and treating the plants for growth, fungi, insects, etc., depending on the particular plants being propagated. Environmental control systems that maintain the light, temperature and humidity for growth are typically part of a greenhouse structure and are employed as appropriate for the particular types of plants.

Typically, a work station is located at either end of the system for the loading and unloading of the plants or cuttings. Trays of vegetative cuttings or rooted plants are attached at their ends to the conveyor in parallel fashion. As the cables slowly move and turn over the pulleys, the containers are transported through the desired number of levels of greenhouse space. For most conventional greenhouses, this will generally be four levels although this number may be modified to accommodate production demand, type of plant propagated, and overall volume of greenhouse overhead space.

Vertical space between the tray levels may be from about 14 to 36 inches to allow for good air circulation. In typical cases where the greenhouse is used to propagate plants for shipping to suppliers, typical space is about 14 inches, depending on the type of plant and a desirable size for shipping or selling. The top levels of cuttings may shade some of the light from the lower levels; however, the continuous motion of the system takes all the cuttings through all the light levels. Each complete revolution of the system may be adjusted but will preferably be from 1 to 2 hours, depending on the type of plants and their cultural requirements. For example, poinsettia cuttings typically root in about 3 weeks. Other plant species require different rooting times. Once rooted, the cuttings are harvested by removing the rooted cuttings from the trays.

Figure 1:
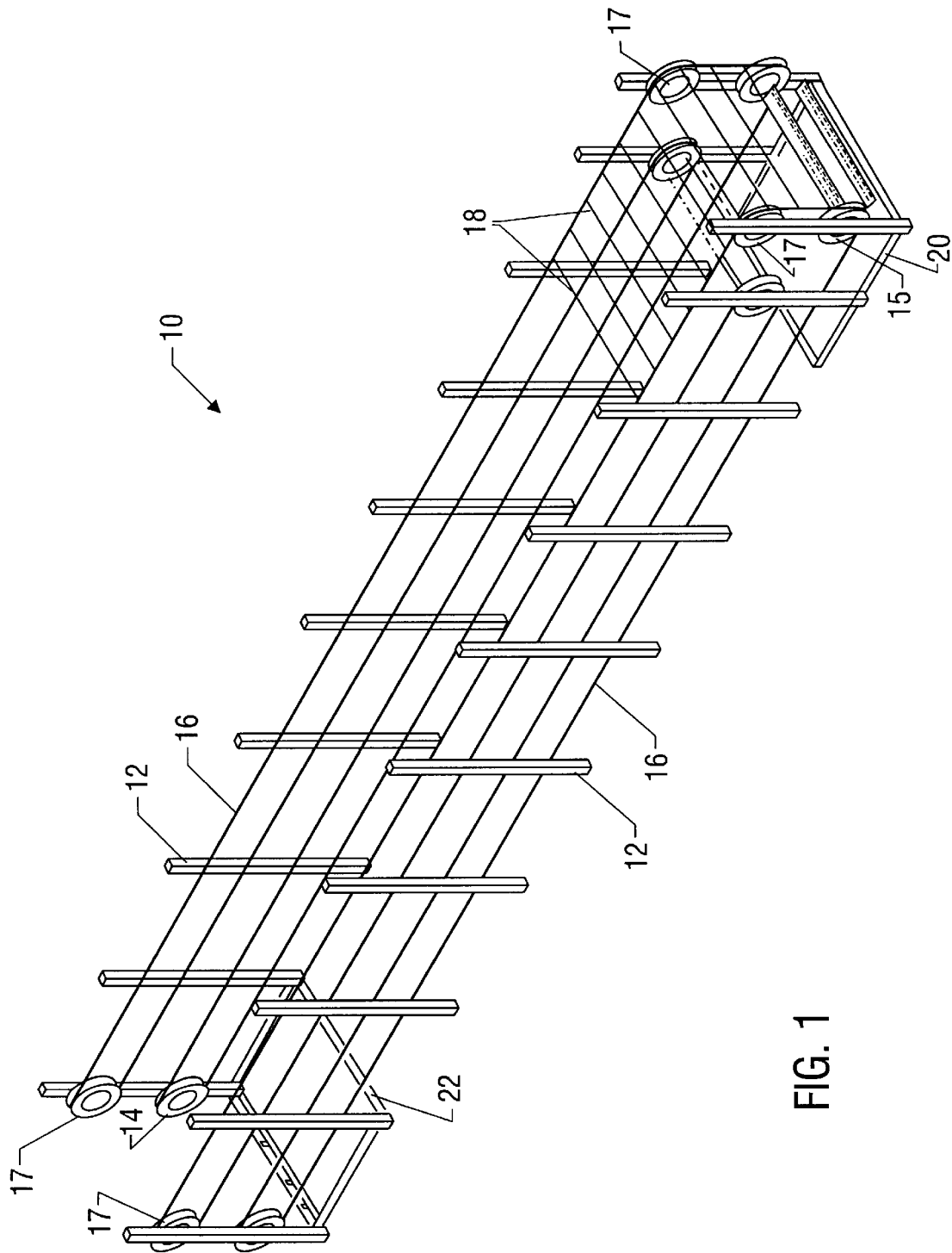
FIG. 1 is an isometric, schematic view of the system showing the supports for two continuous cables and the pulleys used to direct the cables along four generally horizontal planes.

The invention may be better understood by reference to the drawings together with the following description. Referring to FIG. 1 and the other figures, the apparatus shown there in a typical preferred installation includes a support frame or framework 10 comprising two parallel rows of support columns 12, a plurality of motor driven pulleys 14, a motor or other power source (not shown) for driving the pulleys, a pair of endless wire cables 16, a plurality of pipe lengths or other plant supports 18, and pans 20 and 22.

The support columns 12 are vertically disposed and mounted on a suitable floor, base frame, or the like. The columns 12 are made of or treated with any material suitable for use in a greenhouse environment. The pulleys are rotatably mounted on columns at the ends of the rows. One of the lowermost pulleys is driven by a motor, not shown, preferably through a common shaft. Simple rollers or other pulleys may be rotatably mounted on columns along the lengths of the cables 16 to reduce any sagging of the cables as considered necessary or desirable.

Figure 2:
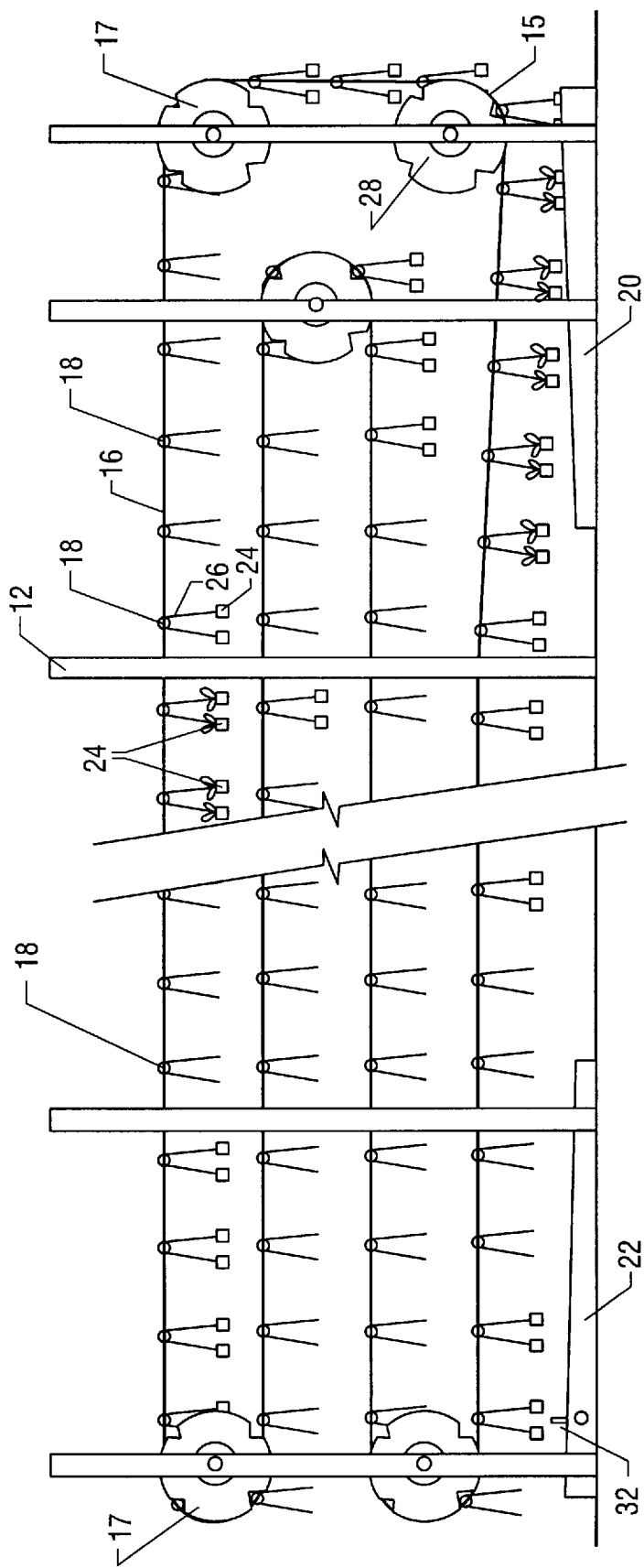
FIG. 2 is a side schematic view of the system showing the pulley arrangement, the narrow trays suspended between the cables, and the end pans.

As shown in FIGS. 1 and 2, the cables 16 wind their way in a serpentine fashion and sequence from lowermost pulleys 15 at a first or lowermost level to uppermost pulleys 17 at a fourth or uppermost level and above the pulleys 15. The cables 16 then return downward to the pulleys 15.

Figure 4A:
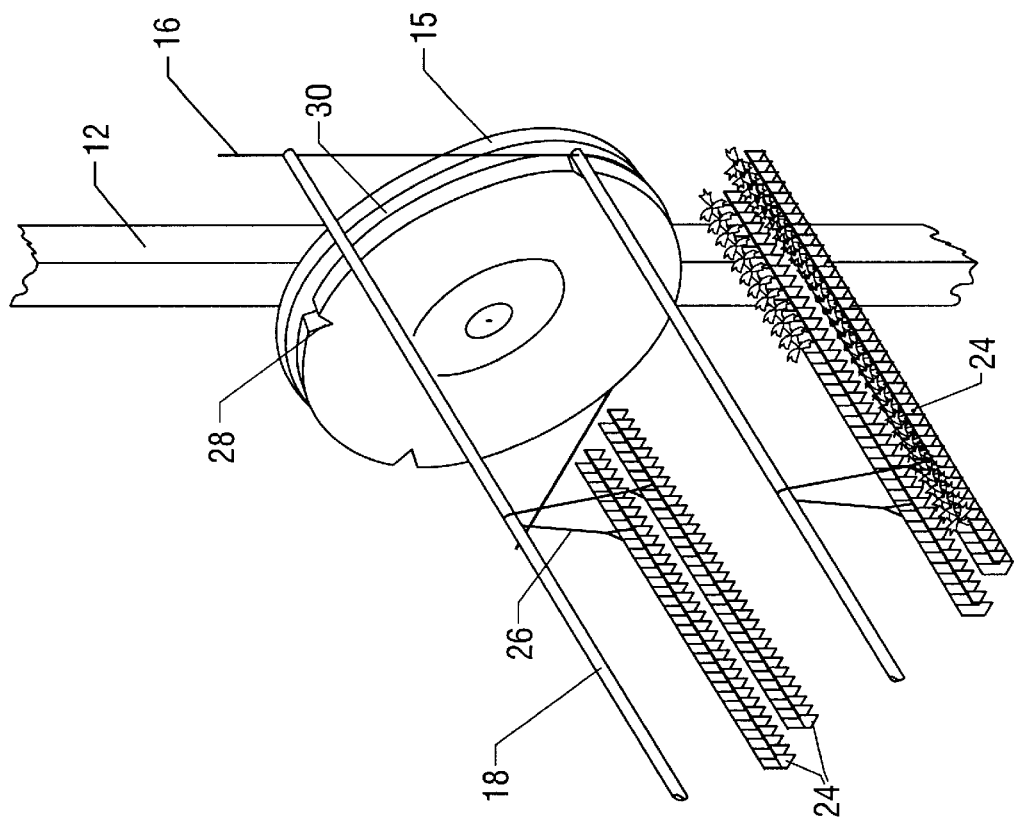
FIG. 4A is an isometric view showing the pulley assembly detail that tracks the cable assembly and keeps the trays perpendicular to the cables.
Figure 4B:
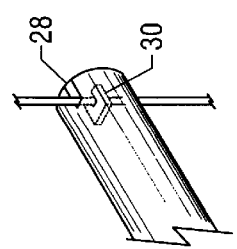
FIG. 4B is an expanded inset view of a connection between a cable and a pipe support.

The pulleys 14 and the cables 16 are positioned inward of the rows of columns 12 to travel between the rows. Pipes, rods or other suitable plant support members 18 extend between the cables 16 and transverse to their direction of travel. They are also retractably connected at their ends to the cables in any suitable manner. As illustrated in FIG. 4–B, they are preferably connected to the cables in such a way as to be easily installed and also easily removed or replaced.

Figure 3:
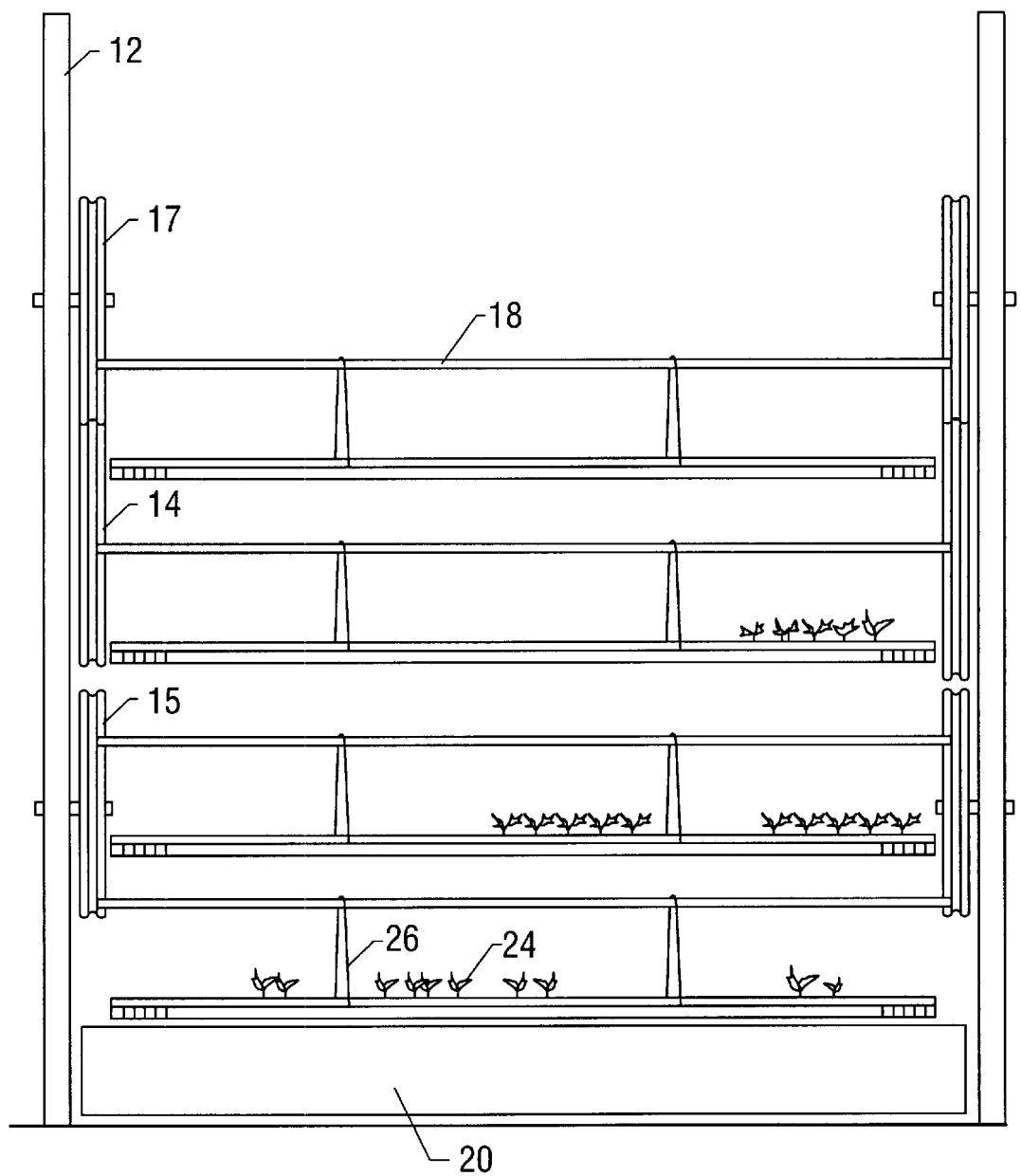
FIG. 3 is a schematic end view of the system.

As shown in FIGS. 2–4, two elongated, wire mesh plant containers 24 are suspended from the pipes 18 by means of wire hangers 26 or other suitable suspension members. The hangers 26 keep the containers 24 positioned between the cables 16, but also enable the containers to remain upright throughout their travel by pivoting relative to the pipes 18.

The pipes 18 are spaced along the cables 16 a distance corresponding to a circumferential distance between the notches 28. (See FIGS. 2, 4 and 4–B.) Thus, as any given tray or container 24 approaches a pulley 14, especially drive pulley 15, the support pipe 18 enters a notch 28 and travels with the pulley. Each pulley 14, 15, 17 preferably has a stop sleeve 30 to receive the ends of the pipes 18 and the cables 16.

As shown in FIGS. 1–3, two pans 20 and 22 are positioned proximate the ends of the overall system for passive irrigation and fertilization and also treatment of the plants. The pan 20 is deep enough to receive and at least partially immerse the plant containers at one end of the pan. The cables then gradually elevate and drain the plants as they travel toward the next pulley or leg. Thus, in FIG. 2, a given plant container travels downward into pan or container 20 and travels upward to pan 22 where a spray device 32 sprays the container above that pan.

It will be noted that for simplicity not all of the wire plant containers have been included in FIG. 2; normally, all of the hangers 26 will be supporting plant containers in the interest of complete utilization of the propagation system.

The invention may be further understood by the following description of its application to the propagation of poinsettias. As in conventional greenhouse operations, vegetative shoot tips removed from mother plants are stuck in a rooting medium in the containers 24. The containers are then attached at each end to the cables 16, and they circulate through the system about every one to two hours or so. As they circulate, they dip into pan 20, where they receive water, nutrients, etc. They then travel across pan 22, where they may be sprayed as desired with fungicides, insecticides, other nutrients and the like. They then reverse direction around the lower left hand pulley in FIG. 2, to the second level or leg. They continue to travel sequentially along third and fourth levels until they reach pulley 17, where they change direction by movement down to and around pulley 15 to begin a new cycle. This continues up to about three weeks when complete rooting will have typically taken place. The trays of rooted cuttings may then be removed from the system for further processing.

By being able to operate under generally normal greenhouse conditions, the system is able to markedly increase the production of poinsettia cuttings and other plants with good control of growth, disease, insects and the like. The economics of the system are very favorable in its use of existing greenhouses, reduced capital investment, favorable labor conditions and costs, and a favorable environment to reduce plant disease.

All of the methods and apparatus disclosed and claimed herein may be made and executed without undue experimentation in light of the present disclosure. While the compositions and methods of this invention have been described in terms of preferred embodiments, it will be apparent to those of skill in the art that variations may be applied to the methods and apparatus described herein without departing from the concept, spirit and scope of the invention. More specifically, it will be apparent that certain features of the system may be varied, such as spray and misting routines, alteration of travel time along the horizontal carrier and carrier tray modification for holding different types of plants. All such similar substitutes and modifications apparent to those skilled in the art are deemed to be within the spirit, scope and concept of the invention as defined by the appended claims.

What is claimed is:

1. Apparatus for cultivating plants in a greenhouse which comprises:

two laterally spaced and generally parallel support frameworks;

two parallel, serpentine endless cables positioned between and extending along said frameworks;

a separate set of pulleys rotatably mounted on each said framework to support a separate said cable thereon to define a separate cable travel path for each cable, said path including generally parallel, vertically spaced travel legs and wherein each cable is movable repeatedly and sequentially from leg to leg beginning with its lowermost leg through its uppermost leg and back to its lowermost leg and changes direction between the end of each said leg and the start of the next said leg;

a plurality of generally parallel support rods spaced along and extending between said cables and supported at opposite ends by said cables; and at least one plant container pendulously supported from each support rod to remain in a vertical disposition throughout movement along said conveyor travel path.

2. Apparatus as defined in claim 1, wherein each support rod at its opposite ends retractably engages the two cables.

3. Apparatus for cultivating plants in a greenhouse which comprises:

a support framework which comprises two laterally spaced rows of spaced posts;

a serpentine endless conveyor positioned between and extending generally parallel to said rows of posts to define a travel path having vertically spaced legs including a lowermost leg, an uppermost leg and at least two intermediate legs, said conveyor comprising a pair of endless cables and a plurality of rods or pipes spaced along and extending between the cables and retractably connected at opposite ends to the cables; and a plurality of plant containers pendulously suspended from said rods or pipes.

4. Apparatus for cultivating plants in a greenhouse which comprises:

two parallel support structures;

parallel endless belts positioned between and parallel to the support structures;

rotatable pulleys rotatably mounted on each support structure and configured to support the endless belts to define parallel ascending serpentine travel paths having at least four superposed and spaced travel legs, each travel leg extending from one pulley at a first lower level to a second pulley at second higher level; and a plurality of elongated plant support members spaced along and extending between the two endless belts and supported at their opposite ends by the two endless belts, each plant support member adapted to support a plant container in a pendulous manner.

5. Apparatus for cultivating plants in a greenhouse which comprises:

an endless conveyor comprising a pair of laterally spaced, parallel endless belts, each belt defining a serpenture travel path including at least four laterally disposed, vertically spaced travel legs;

a support structure extending along each side of the endless conveyor;

a plurality of pull-ups rotatably mounted on the support structure along each said belt to support the belts as they travel along their travel paths and to change the direction of travel of the belts between each travel leg and the next travel leg; and a plurality of generally parallel plant support rods extending between the endless belts at spaced intervals along the endless belts and connected at their opposite ends to the endless belts, each said plant support rod being capable of supporting a plurality of plant containers in a pendulous manner.

6. Apparatus as defined in claim 5 wherein the plant support rods are releasably connected to the endless belts.

7. Apparatus as defined in claim 5 which further comprises a first pan positioned below the lowest travel leg of the endless belt and configured to receive plant containers transported by the endless belts for contact with water or nutrients in the pair.

8. Apparatus as defined in claim 5 which further comprises a spray device supported by the support structure and adapted to spray selected materials on plants carried by the endless belts.

* * * * *

UNITED STATES PATENT AND TRADEMARK OFFICE
CERTIFICATE OF CORRECTION

PATENT NO.    :   5,943,818
DATED         :   August 31, 1999
INVENTOR(S)   :   Franz Fruehwirth It is certified that error appears in the above-identified patent and that said Letters Patent is hereby corrected as shown below:

On the title page, at [73], please delete "Paul Ecke Ranch, Inc. Encinitas, Calif."

Signed and Sealed this

Second Day of May, 2000

Attest:

Q. TODD DICKINSON

*Attesting Officer*      *Director of Patents and Trademarks*